(12) United States Patent  
Ramachandra et al.

(10) Patent No.: US 12,445,918 B2  
(45) Date of Patent: Oct. 14, 2025

(54) NEXT GENERATION HANDOVER FAILURE DUE TO UNSUPPORTED USER EQUIPMENT CAPABILITIES

(71) Applicant: Telefonaktiebolaget LM Ericsson (PUBL), Stockholm (SE)

(72) Inventors: Pradeepa Ramachandra, Linköping (SE); Oumer Teyeb, Montréal (CA); Angelo Centonza, Torrenueva Costa Granada (ES)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 388 days.

(21) Appl. No.: 17/999,959

(22) PCT Filed: Jun. 3, 2021

(86) PCT No.: PCT/IB2021/054889  
§ 371 (c)(1),  
(2) Date: Nov. 28, 2022

(87) PCT Pub. No.: WO2021/245604  
PCT Pub. Date: Dec. 9, 2021

(65) Prior Publication Data  
US 2023/0232291 A1 Jul. 20, 2023

Related U.S. Application Data

(60) Provisional application No. 63/034,756, filed on Jun. 4, 2020.

(51) Int. Cl.  
*H04W 36/00* (2009.01)

(52) U.S. Cl.  
CPC .............. *H04W 36/0079* (2018.08)

(58) Field of Classification Search  
CPC ........... H04W 4/40; H04W 4/46; H04W 4/44; H04W 12/06; H04W 12/069;  
(Continued)

(56) References Cited

U.S. PATENT DOCUMENTS 11,134,424 B2 * 9/2021 Park ................ H04W 36/00698  
2014/0016614 A1 * 1/2014 Velev ................... H04W 76/10  
370/331  
(Continued)

FOREIGN PATENT DOCUMENTS

CN 109392038 A 2/2019  
EP 2922342 B1 * 8/2018 ........ H04W 36/0061  
(Continued)

OTHER PUBLICATIONS

PCT Notification of Transmittal of the International Search Report and the Written Opinion of the International Searching Authority, or the Declaration issued for International application No. PCT/IB2021/054889—Sep. 10, 2021.

*Primary Examiner* — Nathan S Taylor

(57) ABSTRACT

A method performed by a target network node includes receiving, from a source network node, a handover request associated with a wireless device. The target network node transmits, via a core network node, a handover reject message to the source network node. The handover reject message comprises a cause value for rejecting the handover request.

23 Claims, 10 Drawing Sheets

(58) Field of Classification Search
CPC ..... H04W 12/08; H04W 12/72; H04W 36/00; H04W 36/0058; H04W 36/08; H04W 64/00; H04W 36/322; H04W 36/32; B60W 60/001; B60W 60/00; G05D 1/02; H04L 63/0892; H04L 9/40
See application file for complete search history.

(56) References Cited

U.S. PATENT DOCUMENTS

| | | | |
|---|---|---|---|
| 2015/0016289 A1* | 1/2015 | Yun | H04W 24/02 370/252 |
| 2015/0156692 A1* | 6/2015 | Kim | H04W 64/00 455/436 |
| 2015/0373770 A1* | 12/2015 | Niemi | H04W 76/18 370/329 |
| 2016/0183156 A1* | 6/2016 | Chin | H04L 61/5007 370/331 |
| 2017/0208515 A1* | 7/2017 | Jonasson | H04W 36/08 |
| 2018/0020417 A1* | 1/2018 | Catovic | H04W 4/70 |
| 2019/0014530 A1* | 1/2019 | Aghili | H04W 48/08 |
| 2019/0021069 A1* | 1/2019 | Chun | H04W 76/10 |
| 2019/0028925 A1* | 1/2019 | Chun | H04L 9/40 |
| 2019/0268831 A1* | 8/2019 | Lee | H04W 48/14 |
| 2019/0306761 A1* | 10/2019 | Jin | H04W 76/11 |
| 2019/0357103 A1* | 11/2019 | Jin | H04W 36/0079 |
| 2019/0394683 A1* | 12/2019 | Sillanpaa | H04W 36/0079 |
| 2020/0229076 A1* | 7/2020 | Jin | H04W 48/14 |
| 2020/0259853 A1* | 8/2020 | Alfano | H04L 43/0876 |
| 2021/0127445 A1* | 4/2021 | da Silva | H04W 76/27 |
| 2021/0235339 A1* | 7/2021 | Babaei | H04W 36/06 |
| 2021/0258857 A1* | 8/2021 | Won | H04W 60/005 |
| 2021/0274570 A1* | 9/2021 | Catovic | H04W 76/10 |
| 2021/0321356 A1* | 10/2021 | Won | H04W 60/02 |
| 2022/0022128 A1* | 1/2022 | Takakura | H04W 8/26 |
| 2022/0141736 A1* | 5/2022 | Muller | H04W 36/0016 370/331 |
| 2022/0182896 A1* | 6/2022 | Talebi Fard | H04W 36/0085 |
| 2022/0248318 A1* | 8/2022 | Qiao | H04W 60/04 |
| 2023/0032220 A1* | 2/2023 | Guo | H04W 12/033 |

FOREIGN PATENT DOCUMENTS

| | | |
|---|---|---|
| EP | 3 576 457 A1 | 12/2019 |
| WO | WO-2016163937 A1 * | 10/2016 |
| WO | 2019228504 A1 | 12/2019 |

* cited by examiner

NEXT GENERATION HANDOVER FAILURE DUE TO UNSUPPORTED USER EQUIPMENT CAPABILITIES

PRIORITY

This nonprovisional application is a U.S. National Stage Filing under 35 U.S.C. § 371 of International Patent Application Serial No. PCT/IB2021/054889 filed Jun. 3, 2021 and entitled "NEXT GENERATION HANDOVER FAILURE DUE TO UNSUPPORTED USER EQUIPMENT CAPABILITIES" which claims priority to U.S. Provisional Patent Application No. 63/034,756 filed Jun. 4, 2020, both of which are hereby incorporated by reference in their entirety.

TECHNICAL FIELD

The present disclosure relates, in general, to wireless communications and, more particularly, systems and methods for Next Generation (NG) handover failure due to unsupported user equipment (UE) capabilities.

BACKGROUND

An RRC_CONNECTED User Equipment (UE) in Long Term Evolution (LTE), which may also be called Evolved-Universal Terrestrial Radio Access (E-UTRA), can be configured by the network to perform measurements. Upon triggering measurement reports, the network may send a handover command to the UE (in LTE an RRConnectionReconfiguration with a field called mobiltyControlInfo and in NR an RRCReconfiguration with a reconfigurationWithSync field).

These reconfigurations are actually prepared by the target cell upon a request from the source node (over X2 interface in case of EUTRA-Evolved Packet Core (EUTRA-EPC) or Xn interface in case of EUTRA-Fifth Generation Core (EUTRA-5GC) or New Radio (NR)) and take into account the existing Radio Resource Control (RRC) configuration the UE has with the source cell (which are provided in the inter-node request). The reconfiguration provided by the target cell contains, inter alia, all information the UE needs to access the target cell such as, for example, a random access configuration, a new Cell-Radio Network Temporary Identifier (C-RNTI) assigned by the target cell, and security parameters enabling the UE to calculate new security keys associated to the target cell. The UE can then send a handover complete message on Signaling Radio Bearer-1 (SRB1) (encrypted and integrity protected) based on new security keys upon accessing the target cell.

FIGS. 1A-1B illustrate flow signalling between UE, source node, and target node during a handover procedure. Both in LTE and NR, some principles exist for handovers (or in more general terms, mobility in RRC_CONNECTED):

Mobility in RRC_CONNECTED is Network-based as the network has best info regarding current situation such as load conditions, resources in different nodes, available frequencies, etc. The network can also take into account the situation of many UEs in the network when performing resource allocation.

The network prepares a target cell before the UE accesses that cell. The source node provides the UE with the RRC configuration to be used in the target cell, including the SRB1 configuration for sending a Handover (HO) complete message The target node provides the UE a target C-RNTI. The target node identifies the UE from MSG.3 on Medium Access Control (MAC) level for the HO complete message. Hence, there is no context fetching unless a failure occurs.

To speed up the handover, the network provides needed information on how to access the target such as, for example. Radio Access Channel (RACH) configuration so the UE does not have to acquire System information (SI) prior to the handover.

The UE may be provided with Contention Free Random Access (CFRA) resources. In that case, the target node identifies the UE from the preamble used during RACH access (MSG.1). The principle behind this is that the procedure can always be optimized with dedicated resources. However, in Conditional Handover (CHO), that might be different as there is uncertainty about the final target but also the timing at which the HO occurs. In any case, the network always aims at providing as detailed instructions as possible to the UE to allow for the quickest possible access to the target cell.

Security is prepared before the UE accesses the target cell. Specifically, keys must be refreshed before sending RRC Connection Reconfiguration Complete message. This message is sent based on the new keys and is encrypted and integrity protected so that the UE can be verified in the target cell.

Both full and delta reconfiguration of the UE are supported so that the HO command can be minimized.

Core Network Based Handover Procedure

When the neighbouring nodes do not have a X2/Xn relation, then the handover can be performed with the help of core network.

FIG. 2 illustrates Inter NG-RAN node N2 based handover. Specifically. FIG. 2 illustrates the preparation phase.

An example description of the NG based Handover procedure follows:

1. Source-Radio Access Network (S-RAN) to Source-Applications Management Function (S-AMF) Handover Required (Target ID, Source to Target transparent container, Session Management N2 interface (SM N2) info list, Protocol Data Unit (PDU) Session Identifiers (Session IDs), intra system handover indication).

A Source to Target transparent container includes Next Generation-Radio Access Network (NG-RAN) information created by S-RAN to be used by the Target-Radio Access Node (T-RAN) and is transparent to $5^{th}$ Generation Core (5GC). It also contains, for each PDU session, the corresponding User Plane Security Enforcement information. Quality of Service (QoS) flows, and/or Data Radio Bearers (DRBs) information subject to data forwarding.

All PDU Sessions handled by the S-RAN (i.e. all existing PDU Sessions with active user plane (UP) connections) shall be included in the Handover Required message, indicating which of those PDU Session(s) are requested by S-RAN to handover.

2. S-AMF to T-RAN Handover Request

S-AMF determines S-RAN based on Target Identifier (Target ID). S-AMF may allocate a 5G-Global Unique Temporary Identifier (5G-GUTI) valid for the UE in the AMF and target Timing Advance Identifier (TAI).

Source to Target transparent container is forwarded as received from S-RAN.

3. T-RAN to S-AMF. The T-RAN sends a Handover Request Acknowledge in a Target to Source transparent container, which includes a List of PDU Sessions to Handover and/or List of PDU Sessions that failed to be established with the failure cause.

The Target to Source transparent container includes a UE container with an access stratum (AS) part and a Non-Access Stratum (NAS) part. The AS part of the UE container is the RRC Handover Command. The UE container is sent transparently via S-AMF and S-RAN to the UE.

T-RAN creates a List of PDU Sessions failed to be setup and reason(s) for failure (e.g., T-RAN decision. S-NSSAI is not available, and/or unable to fulfill User Plane Security Enforcement) based on T-RAN determination. The information is provided to the S-RAN.

4. S-AMF to S-RAN. Handover Command (Target to Source transparent container. List Of PDU Sessions to be handed-over. List Of PDU Sessions failed to be setup).

The Target to Source transparent container is forwarded as received from S-AMF.

5. S-RAN to UE: Handover Command (UE container).

UE container is a UE part of the Target to Source transparent container which is sent transparently from T-RAN via AMF to S-RAN and is provided to the UE by the S-RAN. The AS part of the UE container is the RRC Handover Command 6. UE to T-RAN: Handover Confirm.

After the UE has successfully synchronized to the target cell, it sends a Handover Confirm message to the T-RAN. Handover is by this message considered as successful by the UE.

Similar procedures are followed for SI based handovers in Evolved Packet System (EPS).

Cell configuration parameters are exchanged between Xn neighbor cells. An example of definition of the Served Cell Information signaled over the Xn interface for an NR cell is specified in Section 9.2.2.11 of 3GPP TS 38.423 v. 16.1.0.

Certain problems exist. For example, when the UE is handed over from one cell to another over the NO interface, the source cell sends the UE capabilities to the target cell via the AMF:

Source node to AMF: HANDOVER REQUIRED-
  →Source to Target Transparent Container (Handover-PreparationInformation)→ue-CapabilityRAT-List.
AMF to target node. HANDOVER REQUEST→Source to Target Transparent Container (HandoverPreparation-Infonnation)→ue-CapabilityRAT-List.

The ue-CapabilityRAT-List includes the UE capabilities.

The target node of the handover checks the UE capabilities as part of the admission control of the UE. If none of the target cell configurations can handle the capabilities of the UE, then the target node rejects the incoming handover request and sends the rejection message, which is forwarded to the source via AMF:

Target node to AMF: HANDOVER FAILURE
AMF to source node. HANDOVER PREPARATION FAILURE In this reply message, the target node also includes a 'cause' value as disclosed in Section 9.3.1.2 of 3GPP TS 38.413-g00.

However, if none of the target cell related sub carrier spacing (SCS) and/or bandwidth configurations are supported by the UE (i.e. the UE capabilities do not allow the UE to access the target cell with specific SCS and bandwidth configurations), none of the cause values clearly indicates that the handover is rejected because of unsupported SCS and/or bandwidth related UE capability. So, a related cause value is missing in the NO interface related signaling.

Further, just by knowing that this UE's SCS/bandwidth capabilities are not known, the source node cannot get to know which SCS and bandwidth is supported by the target cell so that it can prevent a future handover request to such a cell when it knows that such a cell do not support the certain UE capabilities.

SUMMARY

Certain aspects of the present disclosure and their embodiments may provide solutions to these or other challenges. For example, according to certain embodiments, methods are provided at a network node to reduce the likelihood of Next Generation (NO) handover failures and, thereby, reduce overall signaling overhead to perform handovers.

According to certain embodiments, a method performed by a target network node includes receiving, from a source network node, a handover request associated with a wireless device and transmitting, via a core network node, a handover reject message to the source network node. The handover reject message includes a cause value for rejecting the handover request.

According to certain embodiments, a target network node includes processing circuitry configured to receive, from a source network node, a handover request associated with a wireless device and transmit, via a core network node, a handover reject message to the source network node. The handover reject message includes a cause value for rejecting the handover request.

According to certain embodiments, a method performed by a source node includes sending, to a target network node, a handover request associated with a first wireless device and receiving, via a core network-node, a handover reject message from the source network node. The handover reject message includes a cause value for rejecting the handover request for the w ireless device.

According to certain embodiments, a source node includes processing circuitry configured to send, to a target network node, a handover request associated with a first wireless device and receive, via a core network node, a handover reject message from the source network node. The handover reject message includes a cause value for rejecting the handover request for the wireless device.

Certain embodiments may provide one or more of the following technical advantages. For example, one technical advantage may be that certain embodiments allow for a proactive way of preventing handover rejections over NG interfaces as the source cell of the handover gets to know, either implicitly or explicitly, the capabilities of the target RAN node and/or target/cell such as, for example, supported SCS, bandwidth, band combinations, etc. The source cell/node may then refrain from trying to hand over UEs to a target node/cell that has capabilities that are incompatible with the UEs' capabilities. This may lead to reduced handover time/latency as, otherwise, the UE may need to be handed over to another target node/cell after the initial handover is rejected. Certain embodiments may also reduce the NO signaling overhead since less handover procedures may be triggered.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now, made to the following description, taken in conjunction with the accompanying drawings, in which.

DETAILED DESCRIPTION

Figure 1A:
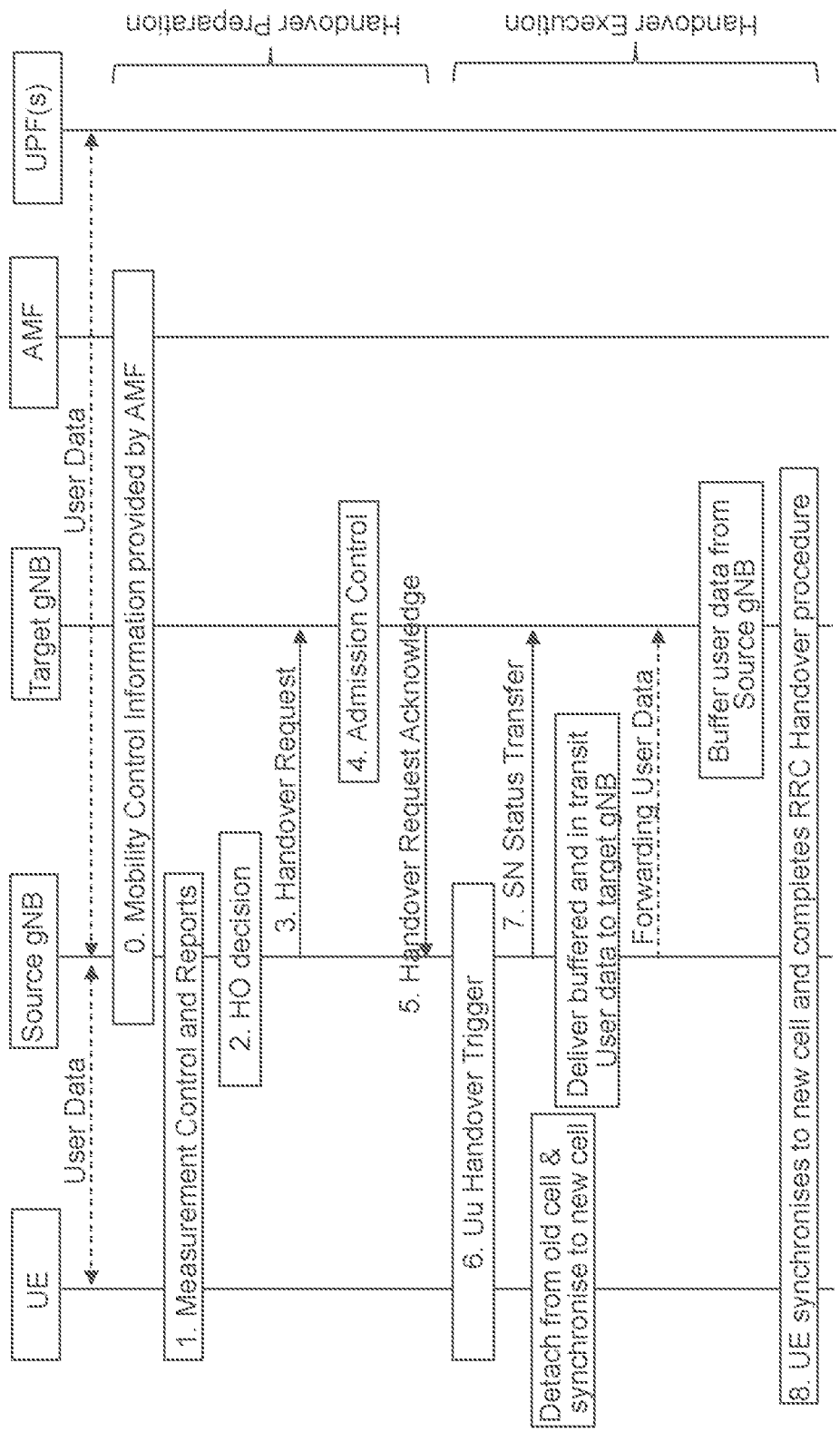
FIGS. 1A-1B illustrate flow signalling between UE, source node, and target node during a handover procedure.
Figure 1B:
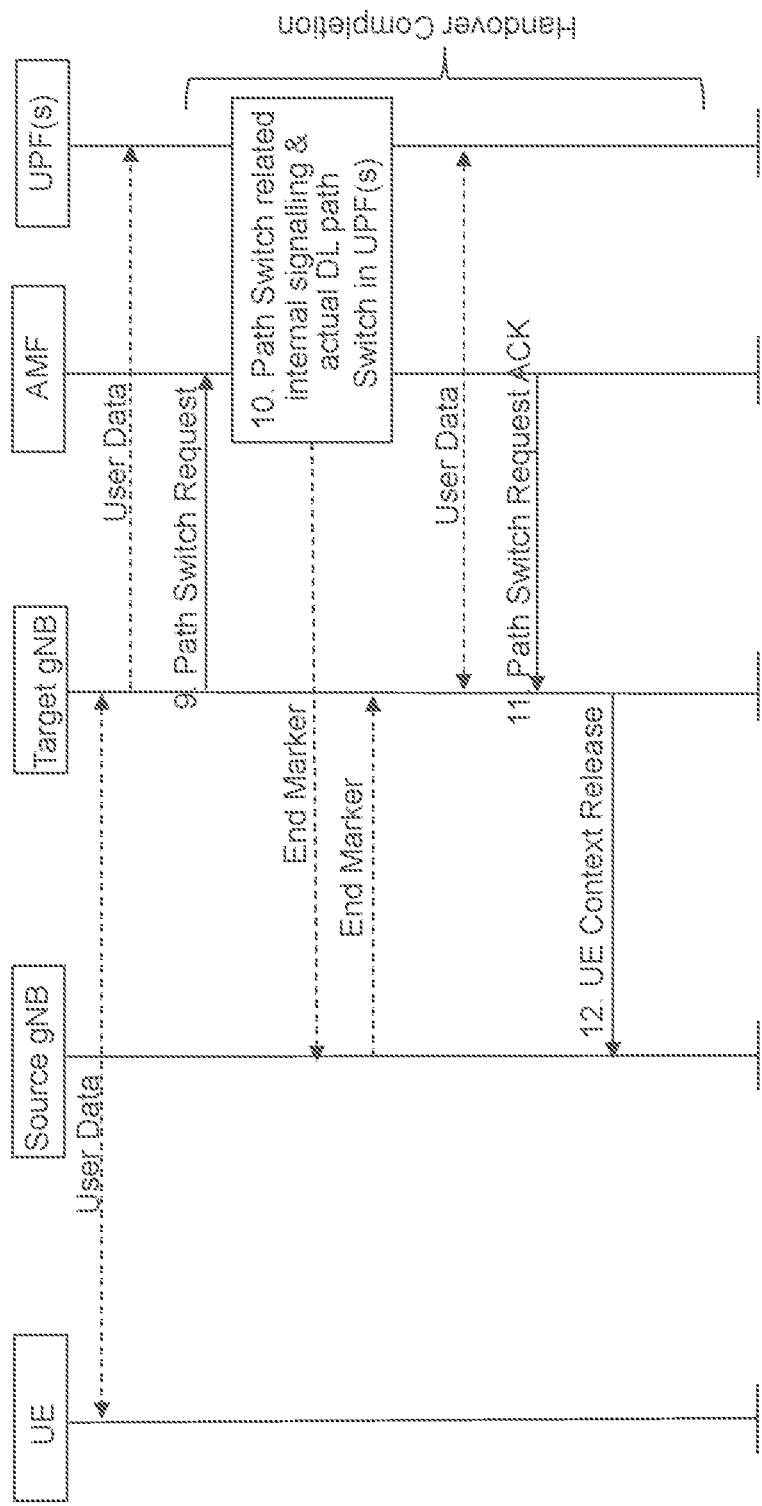
Figure 2:
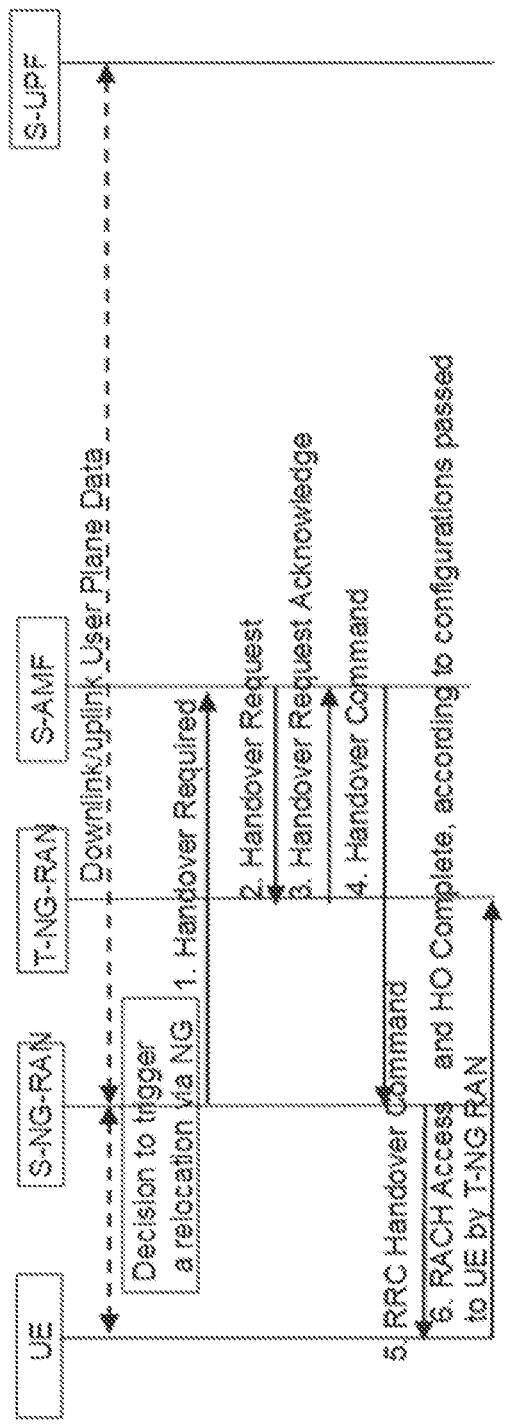
FIG. 2 illustrates an Inter NG-RAN node N2 based handover.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein, rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, Master eNodeB (MeNB), a network node belonging to Master Cell Group (MCG) or Secondary Cell Group (SCG), base station (BS), multi-standard radio (MSR) radio node such as MSR BS, eNodeB (eNB), gNodeB (gNB), network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g. Mobile Switching Center (MSC), Mobility Management Entity (MME), etc.), Operations and Maintenance (O&M), Operations Support System (OSS), Self Organizing Network (SON), positioning node (e.g., evolved Serving Mobile Location Center (E-SMLC)), Minimization of Drive Tests (MDT), test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, Personal Digital Assistant (PDA). Tablet, mobile terminals, smart phone, laptop embedded equipped (LEE), laptop mounted equipment (LME), Unified Serial Bus (USB) dongles. UE category M1. UE category M2, Proximity Services UE (ProSe UE), Vehicle-to-Vehicle UE (V2V UE), Vehicle-to-Anything UE (V2X UE), etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. Further, it is recognized that in any of the following embodiments, the transmitter or receiver could be either a gNB or a UE.

The term NG interface is used in the explanation of certain embodiments described herein, but any of the disclosed embodiments and techniques are also applicable for an SI interface as well.

Though certain embodiments are described as being applicable in an intra-system scenario (RAN nodes connected to the same core network), the embodiments disclosed herein, including the enhanced 'cause' value and 'further failure information' messages, are also applicable to the communication between AMF and MME or between MME and AMF in the case of inter-system handover failures due to the mismatch between UE and network node capabilities. Accordingly, though certain embodiments described herein mainly discuss the intra-RAT scenario, the same embodiments may also be applicable for the inter-RAT handover scenario such as, for example, when a handover from LTE to NR is rejected by the NR cell as the UEs supported minimum uplink (UL) and/or downlink (DL) bandwidth is larger than the maximum UL and/or DL bandwidth of the said NR cell or vice-versa.

Additionally, certain embodiments are described herein with the SCS, UL/DL bandwidth, and/or certain band-combination mismatch between the UE and the target cell as being highlighted. However, it is recognized that other capability mismatches like 'PDCP/RLC sequence number format' etc. can also be reasons for handover rejection. In such cases, respective new 'cause' values are added, and the supported sequence number format of the target cell is included in the 'further failure information'. Thus, the disclosed techniques and embodiments described herein may be adapted for any reason resulting in a handover rejection Generalized Solution for Indicating Capability Mismatch Related 'Cause' Value:

According to certain embodiments, a target cell rejects an incoming handover due to mismatch between the UE capability and the target cell's capability. Thereafter, according to certain embodiments, the target cell may include an index or reference to the UE capability that led to decision of rejection of handover from the target cell. By doing so, the source node/cell may get to know the exact reason for the rejection. This allows for not including a new 'cause' value for different mismatches between UE capability and target cell capabilities. Thus, there may be no need to explicitly include a 'cause' related information element, in some embodiments Instead, the target node may provide an index to the UE capability that is not supported by the target node. For example, the target node might indicate $5^{th}$ index in the UE capability is not supported. The source can then check what is the $5^{th}$ UE capability and understand that the target node does not support that feature.

For example, a method at or by a network node such as, for example, a source RAN node is provided to reduce the likelihood of NG handover failures and, thereby, reduce overall signaling overhead to perform handovers. According to certain embodiments, the method includes:

Receiving, via AMF, a handover request associated to a UE from another network node such as, for example, a source RAN node.

Checking the incoming UE's radio capabilities in terms of at least supported SCS, supported Uplink (UL) Downlink (DL) bandwidth, and supported UL/DL band combinations, Determining if the network and UE's capabilities are compatible (e.g. UE can support the SCS, bandwidth, band combinations, etc. that the target cell can provide);

On determining that the U E's and network capabilities are incompatible, sending a handover reject message (HANDOVER FAILURE) to the AMF for the said UE with the failure indication comprising of one or more of the following information.

Indicating a 'cause' value in the handover reject message which indicates that the target cell does not support a configuration that is compatible with the UE's capabilities. e.g. target does not support any of the UE's supported SCS or/and bandwidth or/and band combination related capabilities Optionally, including the target cell capabilities in the form of e.g., Serving Cell Information defined in 3GPP TS 38.423, or a subset of such information, e.g. a list of SCS, bandwidth and band combination configurations supported by the target cell.

In another example, methods at a network node such as, for example, a source RAN node are provided to reduce the likelihood of NG handover failures and, thereby, reduce overall signaling overhead to perform handovers. According to certain embodiments, the method includes:

Sending a handover request associated to a UE to a first network node (target RAN node) via AMF;

Receiving a handover reject message (HANDOVER PREPARATION FAILURE) from the AMF for the said UE with the failure indication comprising of one or more of the following information;

Indicating a 'cause' value in the handover reject message which indicates that the target cell does not support a configuration that is compatible with the UE's capabilities, e.g. target does not support any of the UE's supported SCS or/and bandwidth or/and band combination related capabilities Optionally, indicating the target cell capabilities in the form of e.g., the Serving Cell Information defined in 3GPP TS 38.423, or a subset of such information. e.g. a list of SCS, bandwidth and band combination configurations supported by the target cell.

Storing the one or more said information associated to the target RAN node (e.g. in a neighbor relation table that contains the target node/Cell identifier and the supported or not supported features/capabilities);

Avoiding sending a handover request message to the same target RAN node via AMF, for one or more of the following cases:

For UEs that have the same/similar capability to the UE that was just rejected

For UEs that do not have compatible capabilities to the capabilities that the target RAN node/Cell has indicated in the handover reject message Creation of Neighbor Relation Table According to certain embodiments, upon receiving the HANDOVER PREPARATION FAILURE message from the AMF that includes the 'cause' value as proposed herein, the source network node stores such an information in a neighbor relation table (either NG neighbor specific table or a NGF+X2/Xn common neighbor specific table). If the HANDOVER PREPARATION FAILURE only includes a 'cause' value but not 'Further failure info' and, if an entry is already available for the said target node, then the source node appends the current list of UE capabilities related to the UE's supported transmission bandwidth (both UL and DL) to the table as the transmission bandwidths not supported by the said target node. If the HANDOVER PREPARATION FAILURE includes a 'cause' value and also includes 'Further failure info', then the source node creates a new entry for the target node's supported transmission bandwidth (both UL and DL). Based on this table, if the same target node is chosen as a handover candidate for some other UE, then the RAN node checks the other UE's capabilities and matches this with the contents of the neighbor relation table associated to the said target node and decides whether to send HANDOVER REQUIRED message to AMF for the handover of the said another UE to the target node or not.

UL Transmission Bandwidth and or Down/lnk Transmission Bandwidth

According to certain embodiments, both UL and DL transmission bandwidth related information is included by the target node in the HANDOVER FAILURE message whereas it is equally possible that the target node includes only UL or DL transmission bandwidth related information depending on which UE capability caused the target node to send HANDOVER FAILURE message to the AMF with failure cause set to as proposed in this invention. The same applies to UL/DL frequency bands.

Example Implementation

The following text provides an example, but not limiting, implementation of the methods described herein. All changes are provided based on the g-00 version of 3GPP TS 38.413. In the following the embodiment, both UL and DL transmission bandwidth related information is sent by the target node to the source node is shown.

9.2.3.3 Handover Preparation Failure

This message is sent by the AMF to inform the source NG-RAN node that the Handover Preparation has failed.

Direction: AMF→NG-RAN node.

| IE/Group Name | Presence | Range | IE type and reference | Semantics description | Criticality | Assigned Criticality |
|---|---|---|---|---|---|---|
| Message Type | M | | 9 3.1.1 | | YES | reject |
| AMF UE NGAP ID | M | | 9.3.3.1 | | YES | ignore |
| RAN UE NGAP ID | M | | 9.3.3.2 | | YES | ignore |
| Cause | M | | 9.3.1.2 | | YES | ignore |
| Further failure Information | O | | 9.2.3.x | Sent when Cause value is one of 'No support for any of SCS supported by the UE, Minimum channel bandwidth supported by the UE is larger than maximum channel bandwidth of the cell, No support for any of SCS supported by the UE and minimum channel bandwidth supported by the UE is larger than maximum channel bandwidth of the cell, Frequency Bands in target cell not compatible with UE capabilities, UE Capabilities not compatible with target cell' | YES | ignore |
| Criticality Diagnostics | O | | 9.3.1.3 | | YES | ignore |

9.2.3.6 Handover Failure

This message is sent by the target NG-RAN node to inform the AMF that the preparation of resources has failed.

Direction: NG-RAN node→AMF.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | ignore |
| Cause | M | | 9.3.1.2 | | YES | ignore |
| Further failure Information | O | | 9.2.3.x | Sent when Cause value is one of 'No support for any of SCS supported by the UE, Minimum channel bandwidth supported by the UE is larger than maximum channel bandwidth of the cell, No support for any of SCS supported by the UE and minimum channel bandwidth supported by the UE is larger than maximum channel bandwidth of the cell, Frequency Bands in target cell not compatible with UE capabilities, UE Capabilities not compatible with target cell' | YES | ignore |
| Criticality Diagnostics | O | | 9.3.1.3 | | YES | ignore |

9.3.1.2 Cause

The purpose of the Cause IE is to indicate the reason for a particular event for the NGAP protocol.

| IE/Group Name | Presence | Range | IE type and reference | Semantics description |
|---|---|---|---|---|
| CHOICE Cause Group >Radio Network Layer | M | | | |
| >>Radio Network Layer Cause | M | | ENUMERATED (Unspecified, TXnRELOCOverall expiry, Successful handover, Release due to NG-RAN generated reason, Release due to 5GC generated reason, Handover cancelled, Partial handover, Handover failure in target 5GC/NG-RAN node or target system, Handover target not allowed, TNGRELOCoverall expiry, TNGRELOCprep expiry, Cell not available, Unknown target ID, No radio resources available in target cell, Unknown local UE NGAP ID, Inconsistent remote UE NGAP ID, Handover desirable for radio reasons, Time critical handover, Resource optimisation handover, Reduce load in serving cell, User inactivity, Radio connection with UE lost, Radio resources not available, Invalid QoS combination, Failure in the radio interface procedure, Interaction with other procedure, Unknown PDU Session ID, Unknown QoS Flow ID, Multiple PDU Session ID Instances, Multiple QoS Flow ID Instances, Encryption and/or integrity protection algorithms not supported, NG intra-system handover triggered, NG inter-system handover triggered, Xn handover triggered, Not supported 5QI value, UE context transfer, IMS voice EPS fallback or RAT fallback triggered, UP integrity protection not possible, UP confidentiality protection not possible, Slice(s) not supported, UE in RRC_INACTIVE state not reachable, Redirection, Resources not available for the slices(s), UE maximum integrity protected data rate reason, Release due to CN-detected mobility, . . . , N26 interface not available, Release due to pre-emption, Multiple Location Reporting Reference ID Instances, No support for any of SCS supported by the UE, Minimum channel bandwidth supported by the UE is larger than maximum channel bandwith of the cell, No support for any of SCS supported by the UE and | |

| IE/Group Name | Presence | Range | IE type and reference | Semantics description |
|---|---|---|---|---|
| | | | minimum channel bandwith supported by the UE is larger than maximum channel bandwith of the cell, Frequency Bands in target cell not compatible with UE capabilities, UE Capabilities not compatible with target cell) | |
| >Transport Layer | | | | |
| >>Transport Layer Cause | M | | ENUMERATED (Transport resource unavailable, Unspecified, . . .) | |
| >NAS | | | | |
| >>NAS Cause | M | | ENUMERATED (Normal release, Authentication failure, Deregister, Unspecified, . . .) | |
| >Protocol | | | | |
| >>Protocol Cause | M | | ENUMERATED (Transfer syntax error, Abstract syntax error (reject), Abstract syntax error (ignore and notify), Message not compatible with receiver state, Semantic error, Abstract syntax error (falsely constructed message), Unspecified, . . .) | |
| >Miscellaneous | | | | |
| >>Miscellaneous Cause | M | | ENUMERATED (Control processing overload, Not enough user plane processing resources, Hardware failure, O&M intervention, Unknown PLMN, Unspecified, . . .) | |

9.3.x Further Failure Information

This IE is used to indicate either the UL and the DL transmission bandwidth.

| IE/Group Name | Presence | Range | IE Type and Reference | Semantics Description |
|---|---|---|---|---|
| UL related | | | | Supported UL transmission bandwidth related information |
| >NR SCS | M | | ENUMERATED (scs15, scs30, scs60, scs120, . . .) | The values scs15, scs30, scs60 and scs120 corresponds to the sub carrier spacing in TS 38.104 [24]. |
| >NR NRB | M | | ENUMERATED (nrb11, nrb18, nrb24, nrb25, nrb31, nrb32, nrb38, nrb51, nrb52, nrb65, nrb66, nrb78, nrb79, nrb93, nrb106, nrb107, nrb121, nrb132, nrb133, nrb135, nrb160, nrb162, nrb189, nrb216, nrb217, nrb245, nrb264, nrb270, nrb273, . . .) | This IE is used to indicate the UL or DL transmission bandwidth expressed in units of resource blocks "$N_{RB}$" (TS 38.104 [24]). The values nrb11, nrb18, etc. correspond to the number of resource blocks "$N_{RB}$" 11, 18, etc. |
| DL related | | | | Supported DL transmission bandwidth related information |
| >NR SCS | M | | ENUMERATED (scs15, scs30, scs60, scs120, . . .) | The values scs15, scs30, scs60 and scs120 corresponds to the sub carrier spacing in TS 38.104 [24], |
| >NR NRB | M | | ENUMERATED (nrb11, nrb18, nrb24, nrb25, nrb31, nrb32, nrb38, nrb51 nrb52, nrb65, | This IE is used to indicate the UL or DL transmission bandwidth expressed in units of resource blocks "$N_{RB}$" (TS |

-continued

| IE/Group Name | Presence | Range | IE Type and Reference | Semantics Description |
|---|---|---|---|---|
| | | | nrb66, nrb78, nrb79, nrb93, nrb106, nrb107, nrb121, nrb132, nrb133, nrb135, nrb160, nrb162, nrb189, nrb216, nrb217, nrb245, nrb264, nrb270, nrb273, . . .) | 38.104 [24]). The values nrb11, nrb18, etc. correspond to the number of resource blocks "$N_{RB}$" 11, 18, etc. |

As another example, the Further Failure Information IE may be included in the Target To Source Transparent Container IE.

Below is a description of the possible meanings of certain example new cause values introduced herein,

| Radio Network Layer cause | Meaning |
|---|---|
| No support for any of SCS supported by the UE | The failure is due to the SCS supported by the target cell not being compatible with the UE capabilities |
| Minimum channel bandwidth supported by the UE is larger than maximum channel bandwidth of the cell. | The failure is due to the channel bandwidth supported by the target cell not being compatible with the UE capabilities |
| No support for any of SCS supported by the UE and minimum channel bandwidth supported by the UE is larger than maximum channel bandwidth of the cell, | The failure is due to the SCS and channel bandwidth supported by the target cell not being compatible with the UE capabilities |
| Frequency Bands in target cell not compatible with UE capabilities. | The failure is due to the frequency bands supported by the target cell not being compatible with the UE capabilities |
| UE Capabilities not compatible with target cell | The failure is due to the target cell not being compatible with the UE capabilities |

Figure 3:
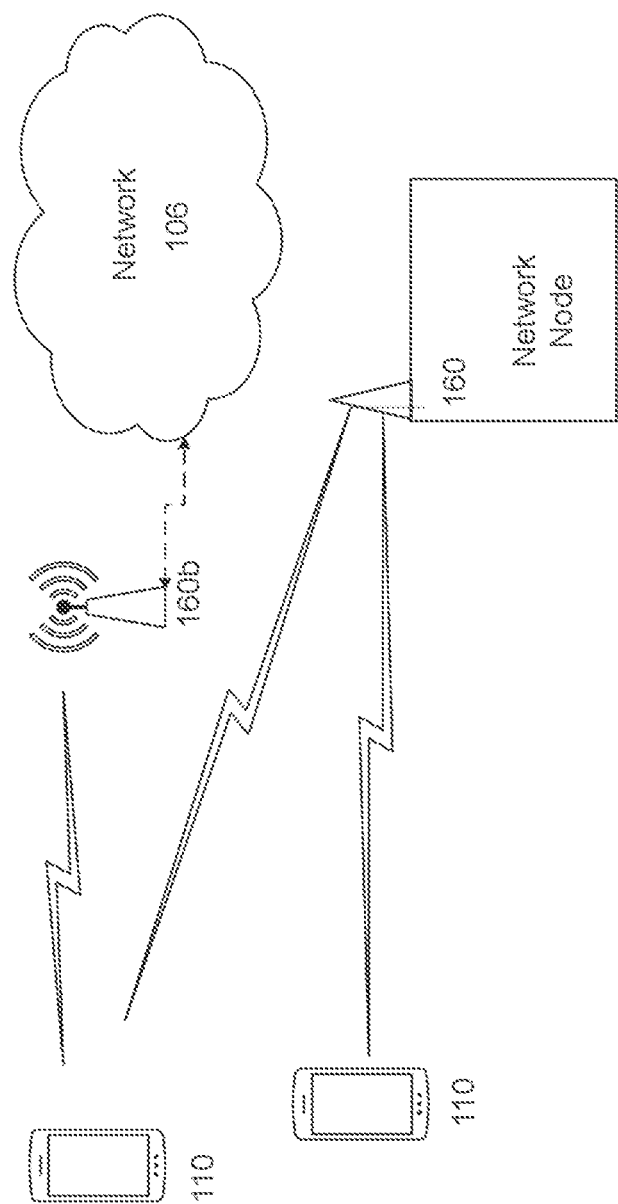
FIG. 3 illustrates an example wireless network, according to certain embodiments.

FIG. 3 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 106, network nodes 160 and 160b, and wireless devices 110. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G. or 5G standards; wireless local area network (WLAN) standards, such as the IEEE 802.11 standards, and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 4:
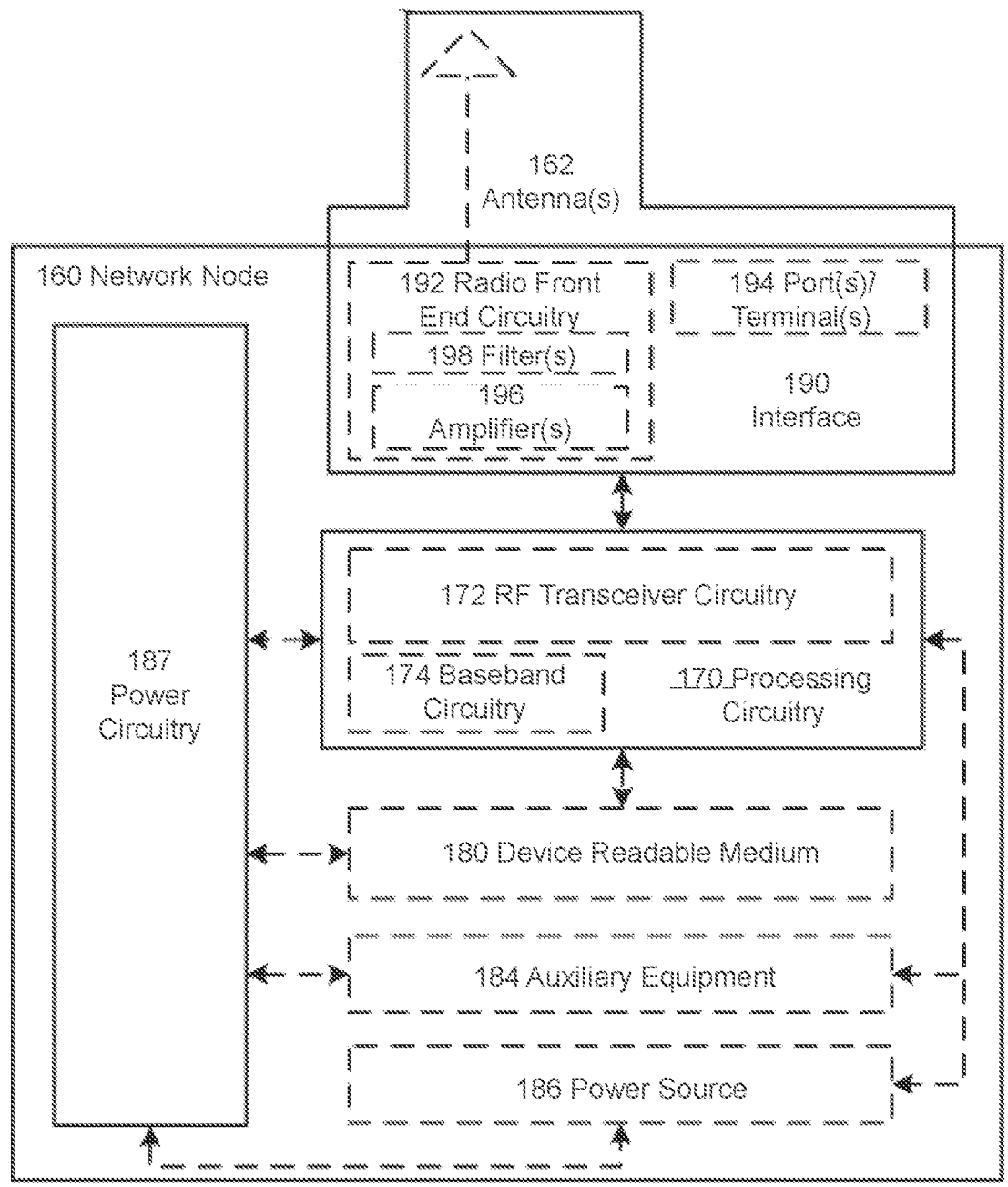
FIG. 4 illustrates an example network node, according to certain embodiments.

FIG. 4 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 160 includes processing circuitry 170, device readable medium 180, interface 190, auxiliary equipment 184, power source 186, power circuitry 187, and antenna 162. Although network node 160 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, mat in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 4 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 5:
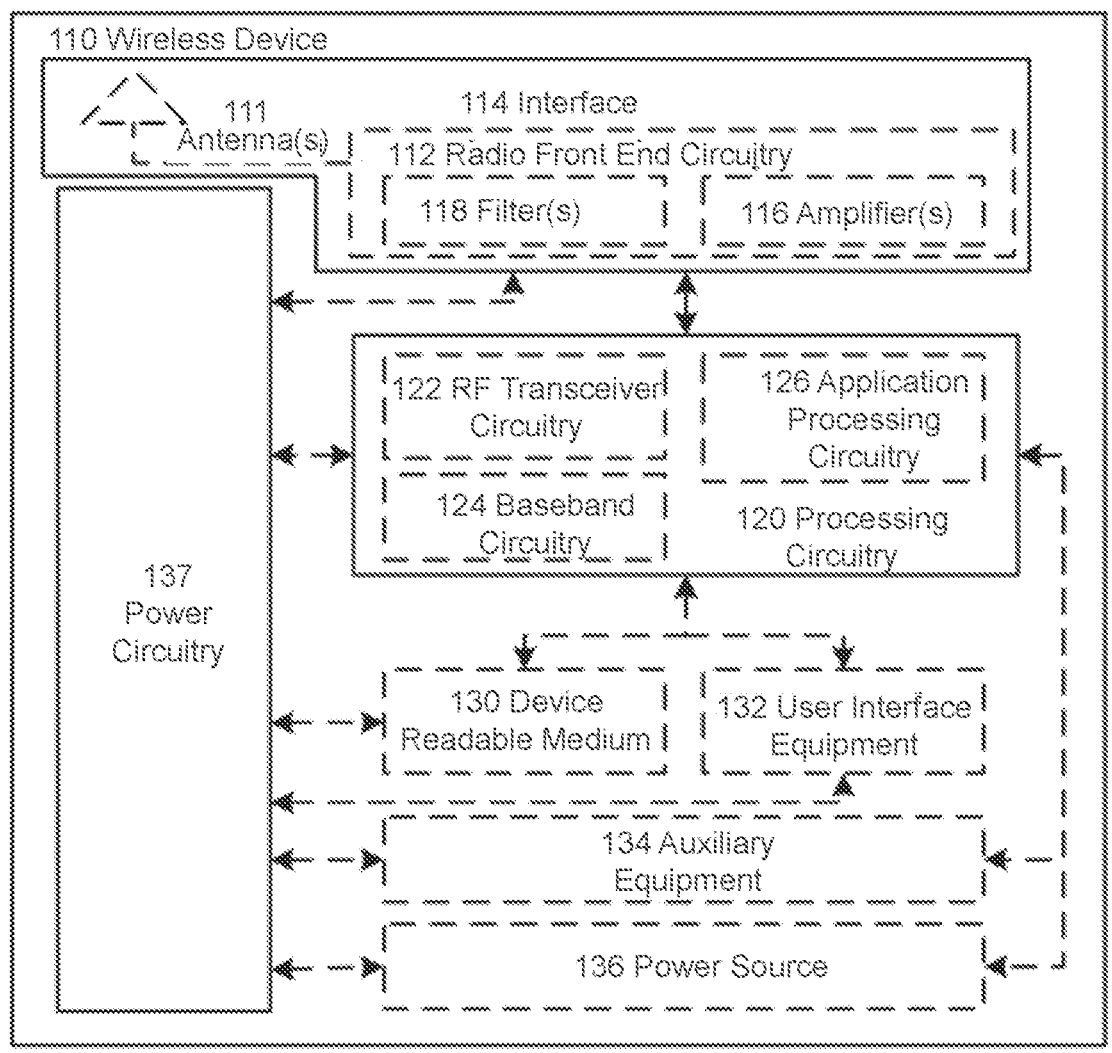
FIG. 5 illustrates an example wireless device, according to certain embodiments.

FIG. 5 illustrates an example wireless device 110. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaining console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g. watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different technologies supported by wireless device; 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hardwired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 be, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen, if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used, wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 6:
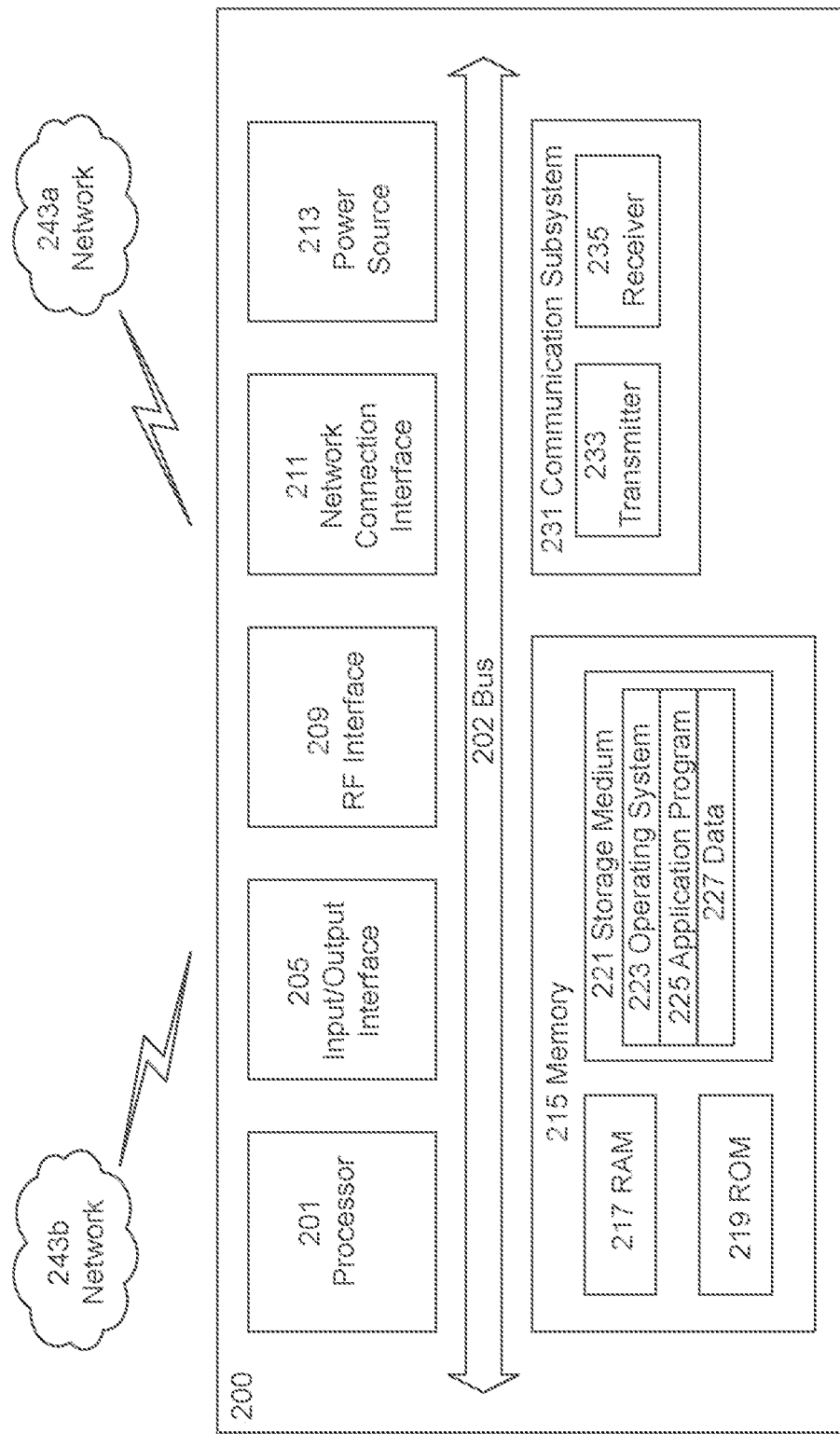
FIG. 6 illustrate an example user equipment, according to certain embodiments.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 4, is one example of a wireless device configured for communication in accordance with one or more communication standards promulgated by the $3^{rd}$ Generation Partnership Project (3GPP), such as 3GPP's GSM. UMTS. LTE, and/or 5G standards. As mentioned previously, the term wireless device and UE may be used interchangeable. Accordingly, although FIG. 6 is a UE, the components discussed herein are equally applicable to a wireless device, and vice-versa.

In FIG. 6, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 6, or only a subset of the components. The level of integration between the components may vary from one UE to another UE. Further, certain UEs mat contain multiple instances of a component, such as multiple processors, memories, transceivers, transmitters, receivers, etc.

In FIG. 6, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware, one or more stored program, general-purpose processors, such as a microprocessor or Digital Signal Processor (DSP), together with appropriate software: or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive. Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 6, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication. Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of IE 200 or partitioned across multiple components of JE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 7:
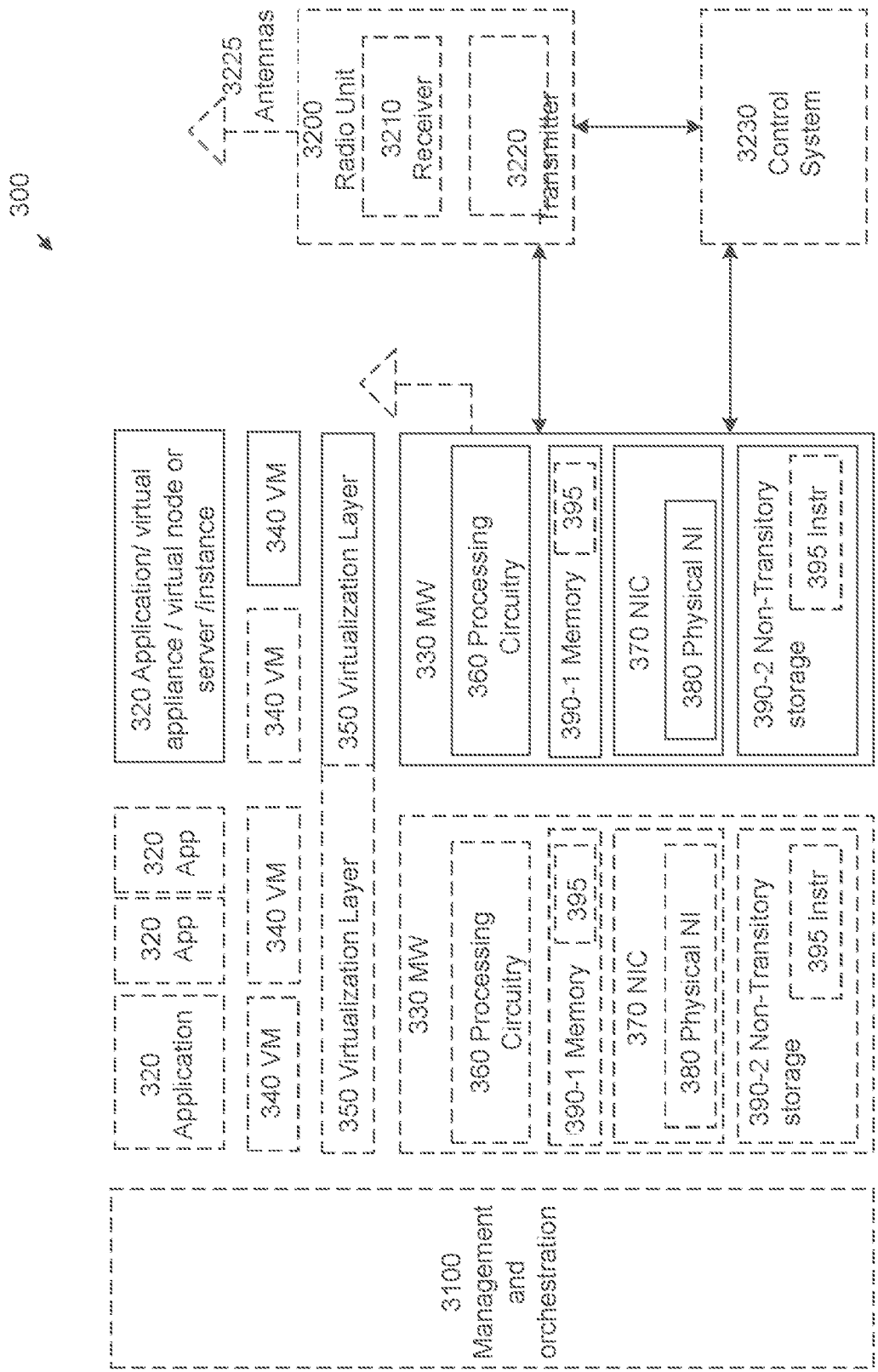
FIG. 7 illustrates a virtualization environment in which functions implemented by some embodiments may be virtualized, according to certain embodiments.

FIG. 7 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be ran by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 7, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 7.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 8:
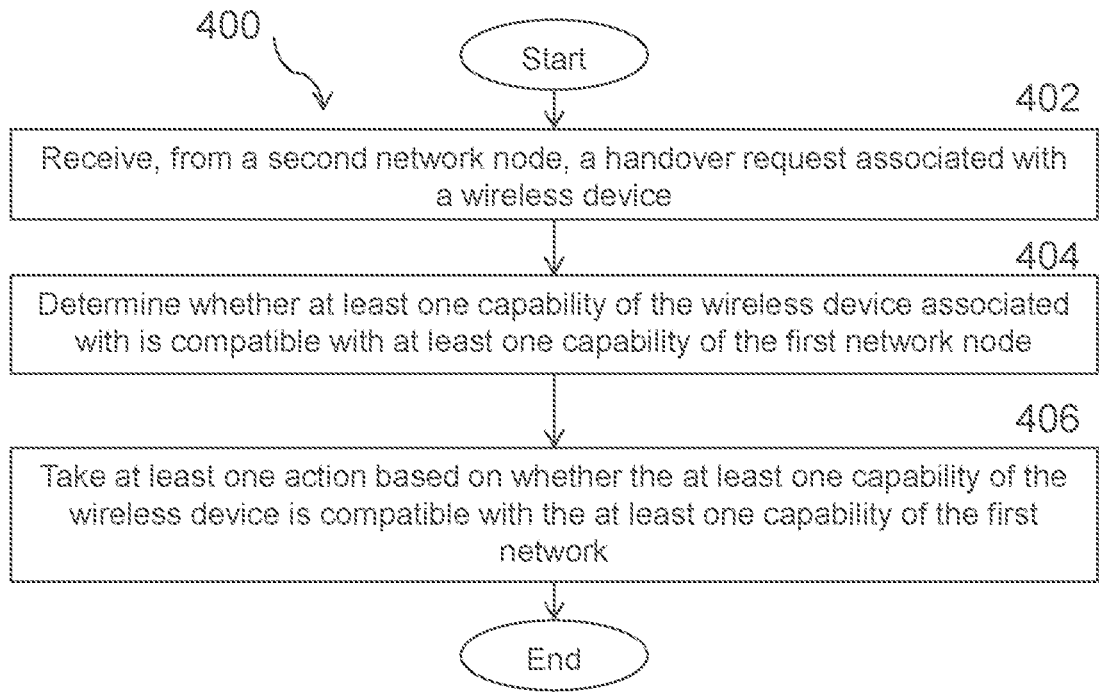
FIG. 8 illustrates an example method by a first network node, according to certain embodiments.

FIG. 8 depicts a method 400 by a first network node, according to certain embodiments. At step 402, the first network node receives, from a second network node, a handover request associated with a wireless device. At step 404, the first network node determines whether at least one capability of the wireless device associated with is compatible with at least one capability of the first network node. At step 406, the first network node takes at least one action based on whether the at least one capability of the wireless device is compatible with the at least one capability of the first network.

In a particular embodiment, the first network node is associated with a target cell associated with the handover of the wireless cell and the second network node is associated with a source cell associated with the handover of the wireless device.

In a particular embodiment, the handover request is received via an Access and Mobility Management Function (AMF).

In a particular embodiment, the at least one capability of the wireless device comprises at least one of: a subcarrier spacing supported by the wireless device; a bandwidth supported by the wireless device; and a band combination supported by the wireless device.

In a particular embodiment, the at least one capability of the first network node comprises at least one of: a subcarrier spacing supported by the first network node: a bandwidth supported by the first network node: and a band combination supported by the first network node.

In a particular embodiment, determining whether the at least one capability of the wireless device is compatible with the at least one capability of the first network node includes determining that the at least one capability of the wireless device is not compatible with the at least one capability of the first network node, and taking the at least one action includes transmitting a handover reject message for the wireless device. The handover reject message is transmitted to the second network node via an Access and Mobility Management Function (AMF), and the handover reject message comprising a failure indication. The failure indication includes a cause value indicating that the first network node does not support a configuration that is compatible with the at least one capability of the wireless device.

In a further particular embodiment, the handover reject message further comprises an indication of the at least one capability of the first network node.

In a particular embodiment, determining whether the at least one capability of the wireless device is compatible with the at least one capability of the first network node includes determining that the at least one capability of the wireless device is compatible with the at least one capability of the first network node, and taking the at least one action includes transmitting a handover accept message for the wireless device. The handover accept message is transmitted to the second network node via an Access and Mobility Management Function (AMF).

Figure 9:
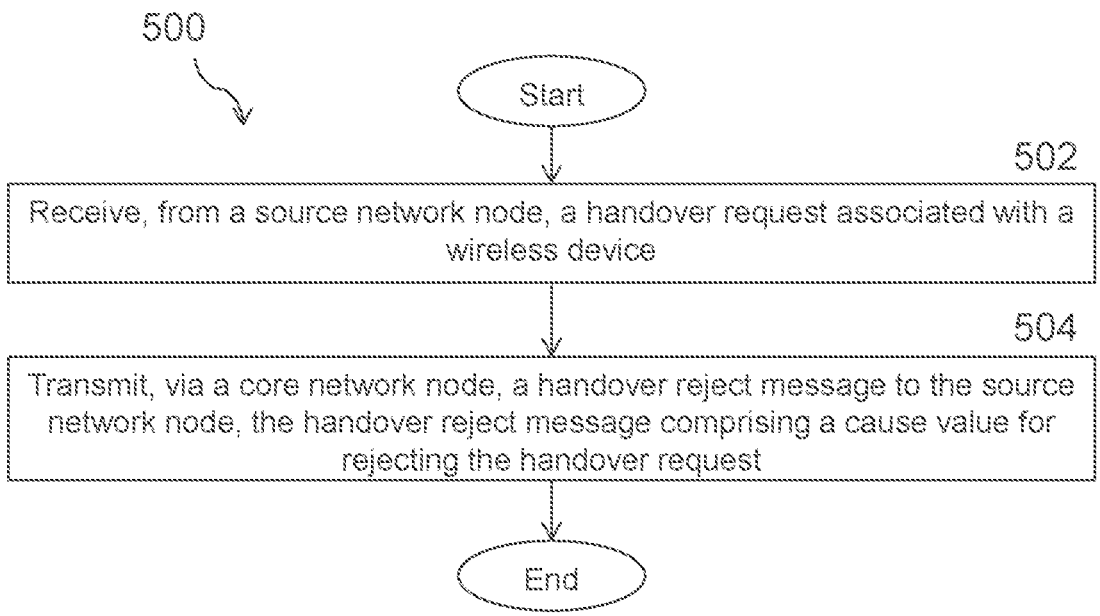
FIG. 9 illustrates an example method by a target network node, according to certain embodiments.

FIG. 9 depicts a method 500 by a target network node 160, according to certain embodiments. At step 502, the target network node 160 receives, from a source network node 160, a handover request associated with a wireless device 110. At step 504, the target network node 160 transmits, via a core network node, a handover reject message to the source network node 160. The handover reject message comprises a cause value for rejecting the handover request.

In a particular embodiment, the target network node 160 is associated with a target cell associated with the handover request for the wireless device 110 and the source network node 160 is associated with a source cell associated with the handover of the wireless device 110.

In a particular embodiment, the cause value indicates at least one of: a subcarrier spacing supported by the wireless device is not supported by the target network node; a bandwidth supported by the wireless device is not supported by the target network node; and a band combination supported by the wireless device is not supported by the target network node In a particular embodiment, the target network node 160 determines that at least one capability of the wireless device 110 associated with the handover request is not compatible with at least one capability of the target network node 160, and the cause value indicates that the at least one capability of the wireless device 110 is not compatible with the at least one capability of the target network node 160.

In a particular embodiment, the at least one capability of the target network node comprises at least one of: a subcarrier spacing supported by the target network node: a bandwidth supported by the target network node, and a band combination supported by the target network node.

In a particular embodiment, the handover reject message further comprises an indication of the at least one capability of the target network node.

In a particular embodiment, the core network node comprises an AMF.

Figure 10:
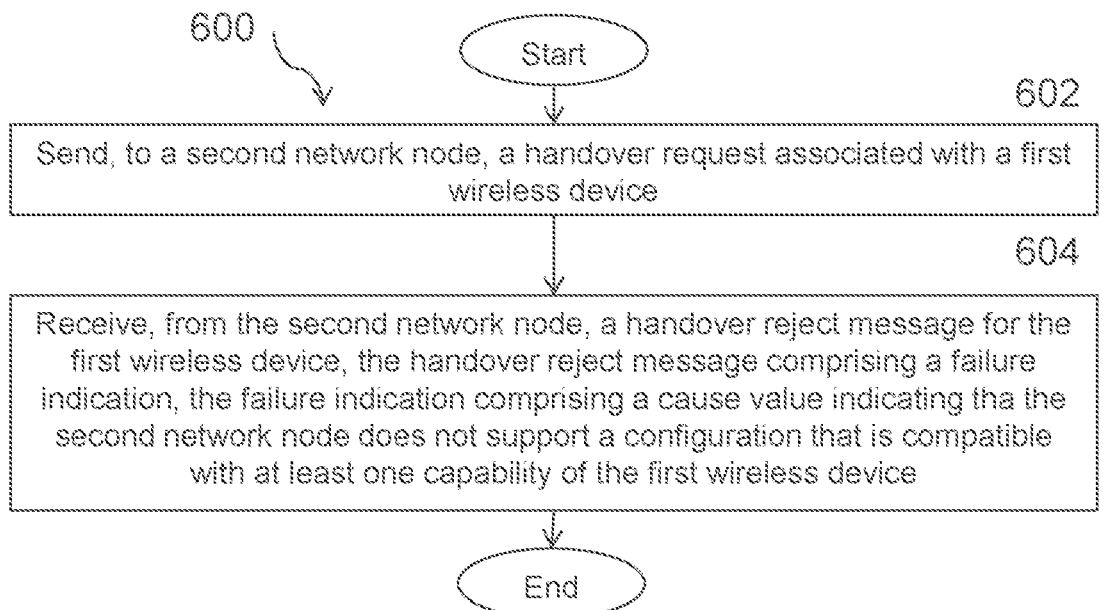
FIG. 10 illustrates an example method by a second network node, according to certain embodiments.

FIG. 10 depicts a method 600 by a first network node, according to certain embodiments. At step 602, the first network node sends, to a second network node, a handover request associated with a first wireless device. At step 604, the first network node receives, from the second network node, a handover reject message for the first wireless device. The handover reject message includes a failure indication, and the failure indication includes a cause value indicating that the second network node does not support a configuration that is compatible with at least one capability of the first wireless device.

In a particular embodiment, the first network node is associated with a source cell associated with the handover of the first wireless cell and the second network node is associated with a target cell associated with the handover of the first wireless device.

In a particular embodiment, the handover request is sent via an Access and Mobility Management Function (AMF), and the handover reject message is received via the AMF In a particular embodiment, the at least one capability of the first wireless device comprises at least one of: a subcarrier spacing supported by the first wireless device; a bandwidth supported by the first wireless device; and a band combination supported by the first wireless device.

In a particular embodiment, the handover reject message further comprises an indication of the at least one capability of the second network node In a further particular embodiment, the at least one capability of the second network node comprises at least one of: a subcarrier spacing supported by the second network node; a bandwidth supported by the second network node; and a band combination supported by the second network node.

In a particular embodiment, the first network node stores information associated with the at least one capability of the second network node. In a further particular embodiment, the information is stored in a neighbor relation table and includes an identifier associated with the second network node.

In a particular embodiment, the first network node determines that at least one capability of a second wireless device is the same as the at least one capability of the first wireless device associated with the handover reject message. Based on the at least one capability of the second wireless device being the same as the at least one capability of the first wireless device associated with the handover reject message, the first network node sends, to a third network node other than the second network node, a handover request for the second wireless device.

In a particular embodiment, based on the stored information associated with the at least one capability of the second network node, the first network node determines that the second network node does not support a configuration that is compatible with at least one capability of a second wireless device, and the first network node sends, to a third network node other than the second network node, a handover request for the second wireless device.

Figure 11:
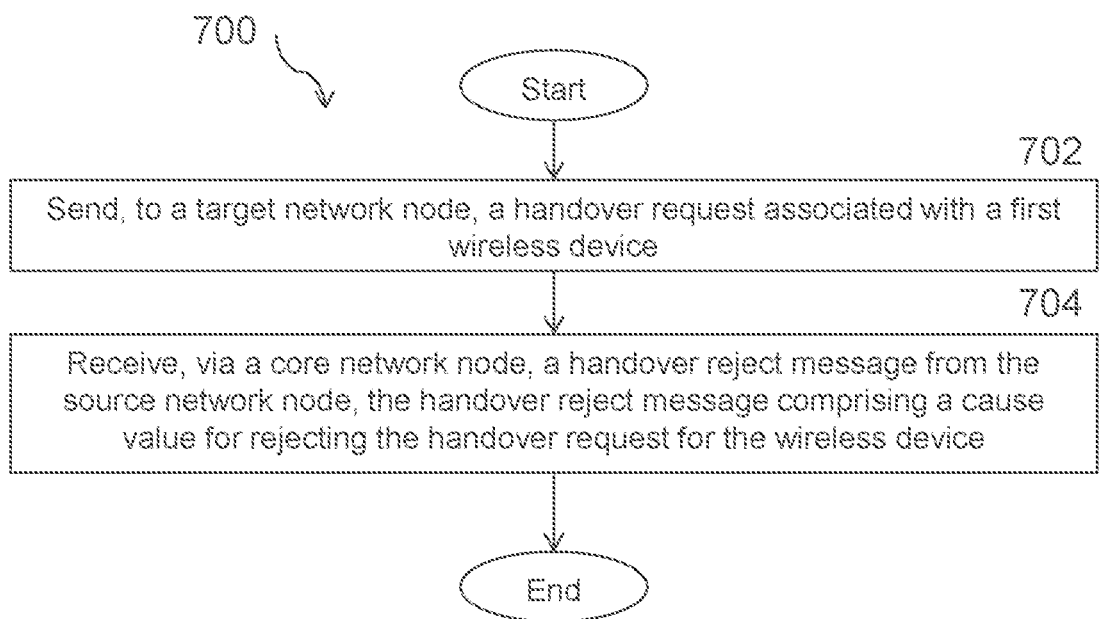
FIG. 11 illustrates an example method by a source network node, according to certain embodiments.

FIG. 11 depicts a method 700 by a source network node 160, according to certain embodiments. At step 702, the source network node 160 sends, to a target network node, a handover request associated with a first wireless device. At step 704, the source network node 160 receives, via a core network node, a handover reject message from the source network node 160. The handover reject message comprises a cause value for rejecting the handover request for the first wireless device.

In a particular embodiment, the source network node 160 is associated with a source cell associated with the handover request for the first wireless device 110 and the target network node is associated with a target cell associated with handover of the first wireless device 110.

In a particular embodiment, the cause value indicates at least one of: a subcarrier spacing supported by the first wireless device 110 is not supported by the target network node 160; a bandwidth supported by the first wireless device 110 is not supported by the target network node 160; and a band combination supported by the first wireless device 110 is not supported by the target network node 160.

In a particular embodiment, the cause value indicates that at least one capability of the first wireless device 110 is not compatible with at least one capability of the target network node 160.

In a particular embodiment, the handover reject message further comprises an indication of at least one capability of the target network node 160.

In a particular embodiment, the at least one capability of the target network node 160 comprises at least one of: a subcarrier spacing supported by the target network node 160; a bandwidth supported by the target network node; and a band combination supported by the target network node.

In a particular embodiment, the source network node 160 stores information associated with the at least one capability of the target network node 160.

In a particular embodiment, the information is stored in a neighbor relation table and includes an identifier associated with the target network node 160.

In a particular embodiment, based on the stored information associated with the at least one capability of the target network node 160, the source network node 160 determines that the at least one capability of the target network node 160 is not compatible with at least one capability of a second wireless device 110 and sends, to another target network node, a handover request for the second wireless device 110.

In a particular embodiment, the source network node 160 determines that at least one capability of a second wireless device 110 is the same as at least one capability of the first wireless device 110 associated with the handover reject message and, based on the at least one capability of the second wireless device 110 being the same as the at least one capability of the first wireless device 110 associated with the handover reject message, sends, to another target network node other than the target network node, a handover request for the second wireless device.

EXAMPLE EMBODIMENTS

Example Embodiment 1. A method performed by a first network node, the method comprising: receiving, from a second network node, a handover request associated with a wireless device, determining whether at least one capability of the wireless device associated with is compatible with at least one capability of the first network node; and taking at least one action based on whether the at least one capability of the wireless device is compatible with the at least one capability of the first network.

Example Embodiment 2. The method of Example Embodiment 1, wherein the first network node is associated with a target cell associated with the handover of the wireless cell and the second network node is associated with a source cell associated with the handover of the wireless device.

Example Embodiment 3. The method of any one of Example Embodiments 1 to 2, wherein the handover request is received via an Access and Mobility Management Function (AMF).

Example Embodiment 4 The method of any one of Example Embodiments 1 to 3, wherein the at least one capability of the wireless device comprises at least one of: a subcarrier spacing supported by the wireless device; a bandwidth supported by the wireless device; and a band combination supported by the wireless device.

Example Embodiment 5. The method of any one of Example Embodiments 1 to 4, wherein the at least one capability of the first network node comprises at least one of: a subcarrier spacing supported by the first network node; a bandwidth supported by the first network node; and a band combination supported by the first network node.

Example Embodiment 6. The method of any one of Example Embodiments 1 to 5, wherein: determining whether the at least one capability of the wireless device is compatible with the at least one capability of the first network node comprises determining that the at least one capability of the wireless device is not compatible with the at least one capability of the first network node; and taking the at least one action comprises transmitting a handover reject message for the wireless device, the handover reject message transmitted to the second network node via an Access and Mobility Management Function (AMF), the handover reject message comprising a failure indication, the failure indication comprising: a cause value indicating that the first network node does not support a configuration that is compatible with the at least one capability of the wireless device.

Example Embodiment 7. The method of Example Embodiment 6, wherein the handover reject message further comprises an indication of the at least one capability of the first network node.

Example Embodiment 8. The method of any one of Example Embodiments 1 to 5, wherein: determining whether the at least one capability of the wireless device is compatible with the at least one capability of the first network node comprises determining that the at least one capability of the wireless device is compatible with the at least one capability of the first network node; and taking the at least one action comprises transmitting a handover accept message for the wireless device, the handover accept message transmitted to the second network node via an Access and Mobility Management Function (AMF).

Example Embodiment 9. A computer program comprising instructions which when executed on a computer perform any of the methods of Example Embodiments 1 to 8.

Example Embodiment 10. A computer program product comprising computer program, the computer program comprising instructions which when executed on a computer perform any of the methods of Example Embodiments 1 to 8.

Example Embodiment 11. A non-transitory computer readable medium storing instructions which when executed by a computer perform any of the methods of Example Embodiments 1 to 8.

Example Embodiment 12. A method performed by a first network node, the method comprising: sending, to a second network node, a handover request associated with a first wireless device; receiving, from the second network node, a handover reject message for the first wireless device, the handover reject message comprising a failure indication, the failure indication comprising: a cause value indicating that the second network node does not support a configuration that is compatible with at least one capability of the first wireless device.

Example Embodiment 13. The method of Example Embodiment 12, wherein the first network node is associated with a source cell associated with the handover of the first wireless cell and the second network node is associated with a target cell associated with the handover of the first wireless device.

Example Embodiment 14. The method of any one of Example Embodiments 12 to 13, wherein the handover request is sent via an Access and Mobility Management Function (AMF), and wherein the handover reject message is received via the AMF Example Embodiment 15. The method of any one of Example Embodiments 12 to 14, wherein the at least one capability of the first wireless device comprises at least one of: a subcarrier spacing supported by the first wireless device; a bandwidth supported by the first wireless device; and a band combination supported by the first wireless device.

Example Embodiment 16. The method of any one of Example Embodiments 12 to 15, wherein the handover reject message further comprises an indication of the at least one capability of the second network node.

Example Embodiment 17. The method of Example Embodiment 16, wherein the at least one capability of the second network node comprises at least one of: a subcarrier spacing supported by the second network node; a bandwidth supported by the second network node; and a band combination supported by the second network node.

Example Embodiment 18. The method of any one of Example Embodiments 16 to 17, further comprising storing information associated with the at least one capability of the second network node.

Example Embodiment 19. The method of Example Embodiment 18, wherein the information is stored in a neighbor relation table and includes an identifier associated with the second network node.

Example Embodiment 20. The method of any one of Example Embodiments 16 to 19, further comprising: determining that at least one capability of a second wireless device is the same as the at least one capability of the first wireless device associated with the handover reject message, and based on the at least one capability of the second wireless device being the same as the at least one capability of the first wireless device associated with the handover reject message, sending, to a third network node other than the second network node, a handover request for the second wireless device.

Example Embodiment 21. The method of any one of Example Embodiments 18 to 19, further comprising based on the stored information associated with the at least one capability of the second network node, determining that the second network node does not support a configuration that is compatible with at least one capability of a second wireless device, and sending, to a third network node other than the second network node, a handover request for the second wireless device.

Example Embodiment 22. A computer program comprising instructions which when executed on a computer perform any of the methods of Example Embodiments 12 to 21.

Example Embodiment 23. A computer program product comprising computer program, the computer program comprising instructions which when executed on a computer perform any of the methods of Example Embodiments 12 to 21.

Example Embodiment 24. A non-transitory computer readable medium storing instructions which when executed by a computer perform any of the methods of Example Embodiments 12 to 21.

Example Embodiment 25. A network node comprising: processing circuitry configured to perform any of the steps of any of Example Embodiments 1 to 24: power supply circuitry configured to supply power to the wireless device.

Example Embodiment 26. The method of any of the previous Example Embodiments, wherein the network node comprises a base station.

Example Embodiment 27. The method of any of the previous Example Embodiments, wherein the wireless device comprises a user equipment (UE).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document. "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method performed by a target network node, the method comprising:
receiving, from a source network node, a handover request associated with a wireless device; and
transmitting, via a core network node, a handover reject message to the source network node, the handover reject message comprising a cause value for rejecting the handover request, wherein the cause value indicates at least one of:
a subcarrier spacing supported by the wireless device is not supported by the target network node;
a bandwidth supported by the wireless device is not supported by the target network node; and
a band combination supported by the wireless device is not supported by the target network node.

2. The method of claim 1, wherein the target network node is associated with a target cell associated with the handover request for the wireless device and the source network node is associated with a source cell associated with handover of the wireless device.

3. The method of claim 1, further comprising determining that at least one capability of the wireless device associated with the handover request is not compatible with at least one capability of the target network node, and wherein the cause value indicates that the at least one capability of the wireless device is not compatible with the at least one capability of the target network node.

4. The method of claim 3, wherein the at least one capability of the target network node comprises at least one of:
a subcarrier spacing supported by the target network node;
a bandwidth supported by the target network node; and
a band combination supported by the target network node.

5. The method of claim 3, wherein the handover reject message further comprises an indication of the at least one capability of the target network node.

6. The method of claim 1, wherein the core network node comprises an Access and Mobility Management Function (AMF).

7. A target network node comprising:
processing circuitry configured to:
receive, from a source network node, a handover request associated with a wireless device; and
transmit, via a core network node, a handover reject message to the source network node, the handover reject message comprising a cause value for rejecting the handover request, wherein the cause value indicates at least one of:
a subcarrier spacing supported by the wireless device is not supported by the target network node;
a bandwidth supported by the wireless device is not supported by the target network node; and
a band combination supported by the wireless device is not supported by the target network node.

8. The target network node of claim 7, wherein the target network node is associated with a target cell associated with the handover request for the wireless device and the source network node is associated with a source cell associated with handover of the wireless device.

9. The target network node of claim 7, wherein the processing circuitry is configured to determine that at least one capability of the wireless device associated with the handover request is not compatible with at least one capability of the target network node, and wherein the cause value indicates that the at least one capability of the wireless device is not compatible with the at least one capability of the target network node.

10. The target network node of claim 9, wherein the at least one capability of the target network node comprises at least one of:
a subcarrier spacing supported by the target network node;
a bandwidth supported by the target network node; and
a band combination supported by the target network node.

11. The target network node of claim 9, wherein the handover reject message further comprises an indication of the at least one capability of the target network node.

12. The method of claim 1, wherein the core network node comprises an Access and Mobility Management Function (AMF).

13. A method performed by a source network node, the method comprising:
sending, to a target network node, a handover request associated with a first wireless device; and
receiving, via a core network node, a handover reject message from the source network node, the handover reject message comprising
a cause value for rejecting the handover request for the first wireless device, wherein the cause value indicates at least one of:
a subcarrier spacing supported by the wireless device is not supported by the target network node;
a bandwidth supported by the wireless device is not supported by the target network node; and
a band combination supported by the wireless device is not supported by the target network node.

14. The method of claim 13, wherein the source network node is associated with a source cell associated with the handover request for the first wireless device and the target network node is associated with a target cell associated with handover of the first wireless device.

15. A source network node comprising:
processing circuitry configured to:
send, to a target network node, a handover request associated with a first wireless device; and
receive, via a core network node, a handover reject message from the source network node, the handover reject message comprising a cause value for rejecting the handover request for the wireless device, wherein the cause value indicates at least one of:
a subcarrier spacing supported by the wireless device is not supported by the target network node;
a bandwidth supported by the wireless device is not supported by the target network node; and
a band combination supported by the wireless device is not supported by the target network node.

16. The source network node of claim 15, wherein the source network node is associated with a source cell associated with the handover request for the first wireless device and the target network node is associated with a target cell associated with handover of the first wireless device.

17. The source network node of claim 15, wherein the cause value indicates that at least one capability of the wireless device is not compatible with at least one capability of the target network node.

18. The source network node of claim 15, wherein the handover reject message further comprises an indication of at least one capability of the target network node.

19. The source network node of claim 18, wherein the at least one capability of the target network node comprises at least one of:
a subcarrier spacing supported by the target network node;
a bandwidth supported by the target network node; and
a band combination supported by the target network node.

20. The source network node of claim 18, wherein the processing circuitry is configured to store information associated with the at least one capability of the target network node.

21. The source network node of claim 20, wherein the information is stored in a neighbor relation table and includes an identifier associated with the target network node.

22. The source network node of claim 20, wherein the processing circuitry is configured to:
based on the stored information associated with the at least one capability of the target network node, determine that the at least one capability of the target network node is not compatible with at least one capability of a second wireless device; and send, to another target network node, a handover request for the second wireless device.

23. The source network node of claim 18, wherein the processing circuitry is configured to:
determine that at least one capability of a second wireless device is the same as at least one capability of the first wireless device associated with the handover reject message, and
based on the at least one capability of the second wireless device being the same as the at least one capability of the first wireless device associated with the handover reject message, send, to another target network node other than the target network node, a handover request for the second wireless device.

* * * * *